March 14, 1933. A. OSCHWALD 1,901,819
PROJECTOR COMPRISING AUTOMATIC PICTURE CHANGING MEANS
Filed Sept. 17, 1932 4 Sheets-Sheet 1
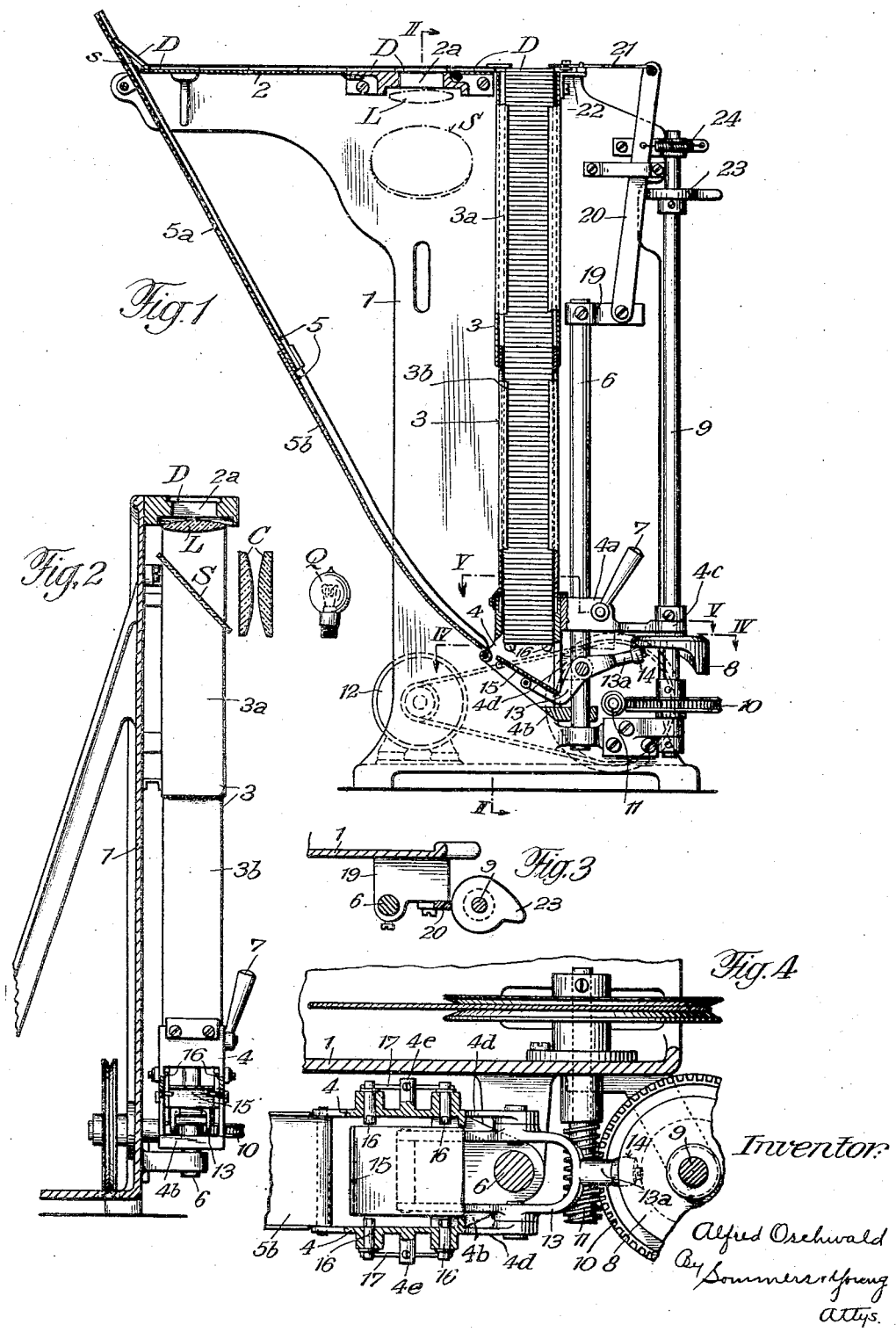

March 14, 1933.   A. OSCHWALD   1,901,819
PROJECTOR COMPRISING AUTOMATIC PICTURE CHANGING MEANS
Filed Sept. 17, 1932   4 Sheets-Sheet 2
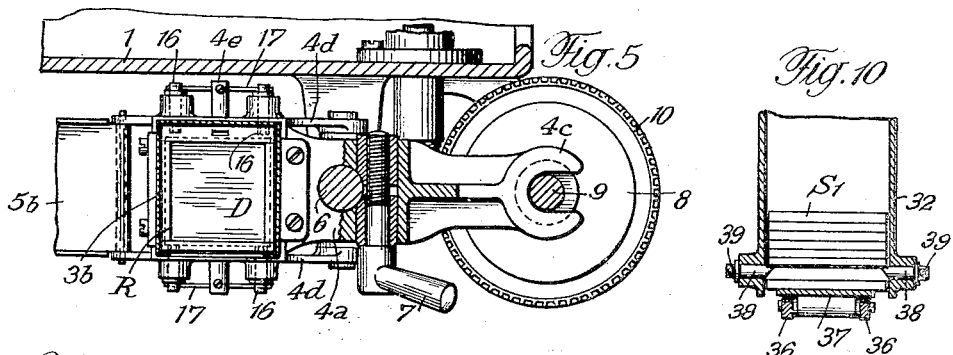
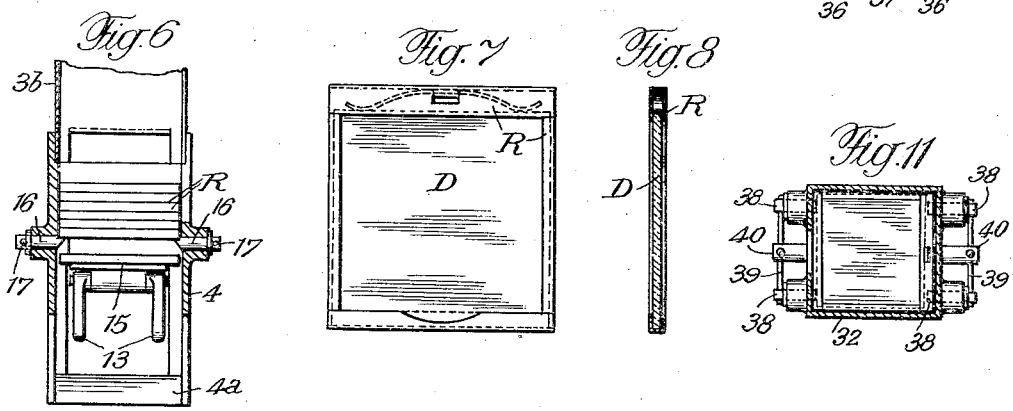
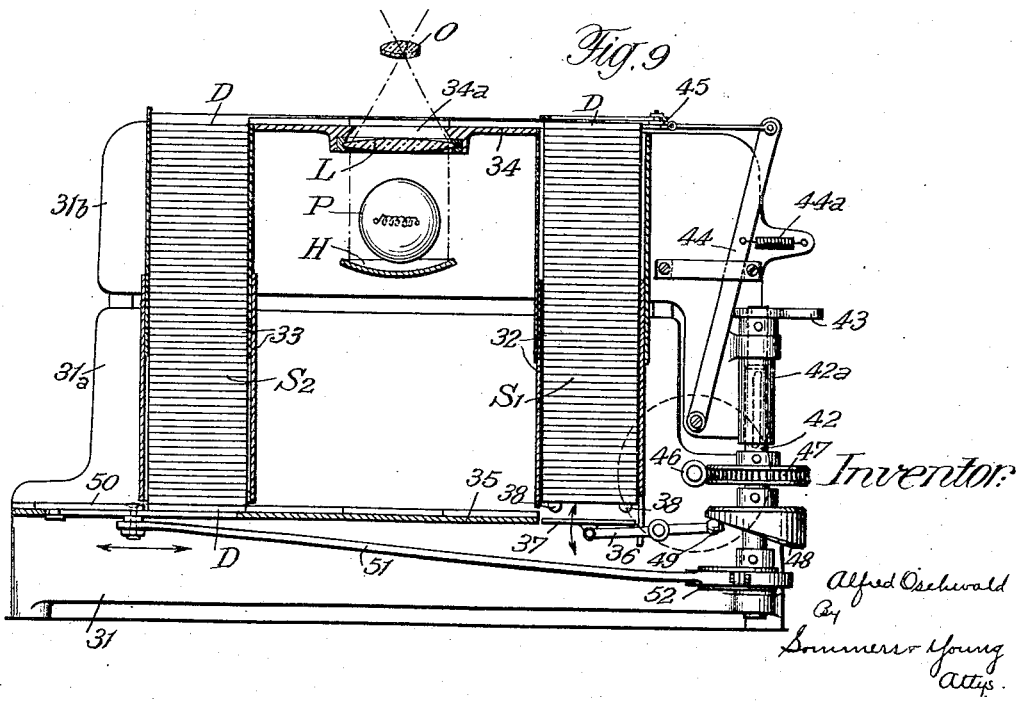

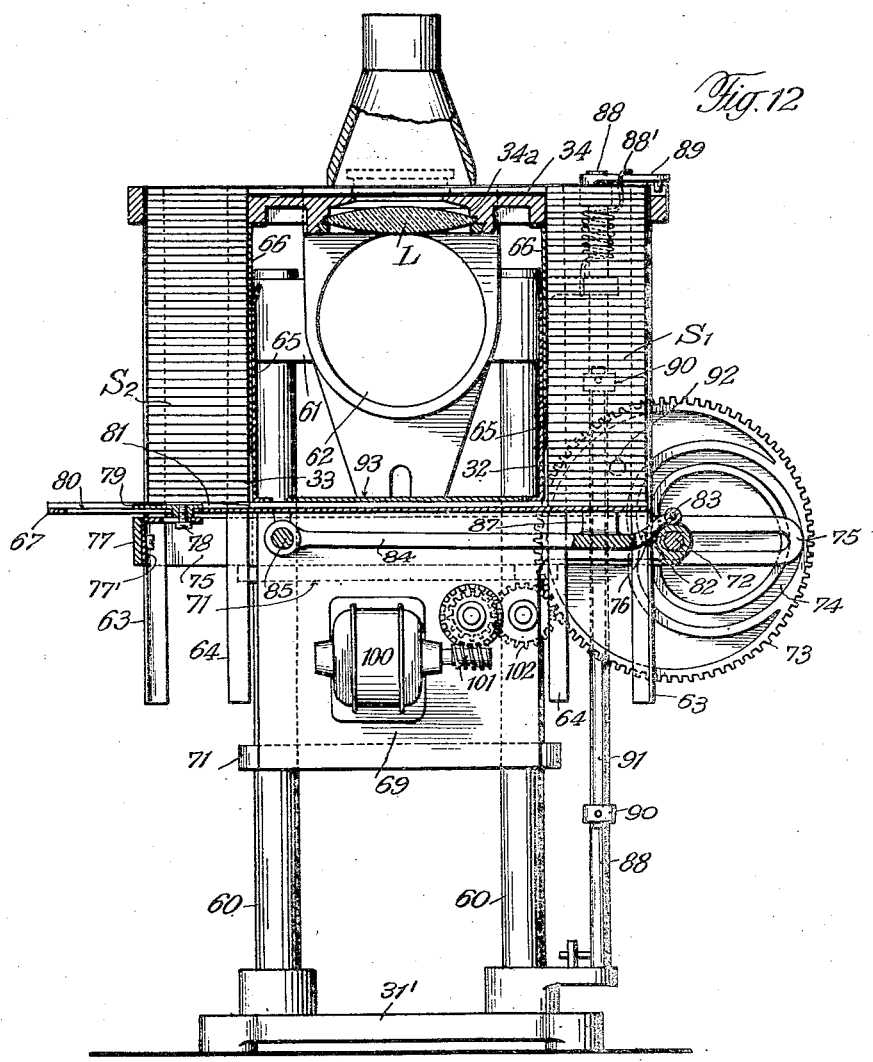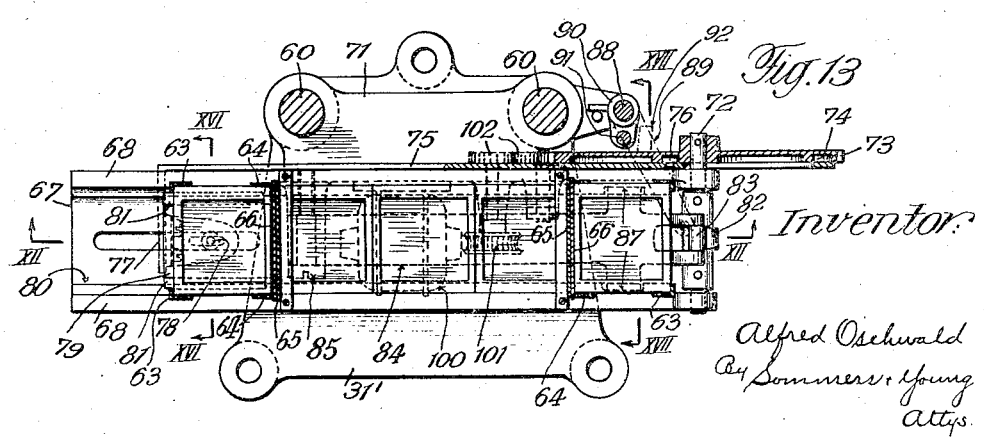

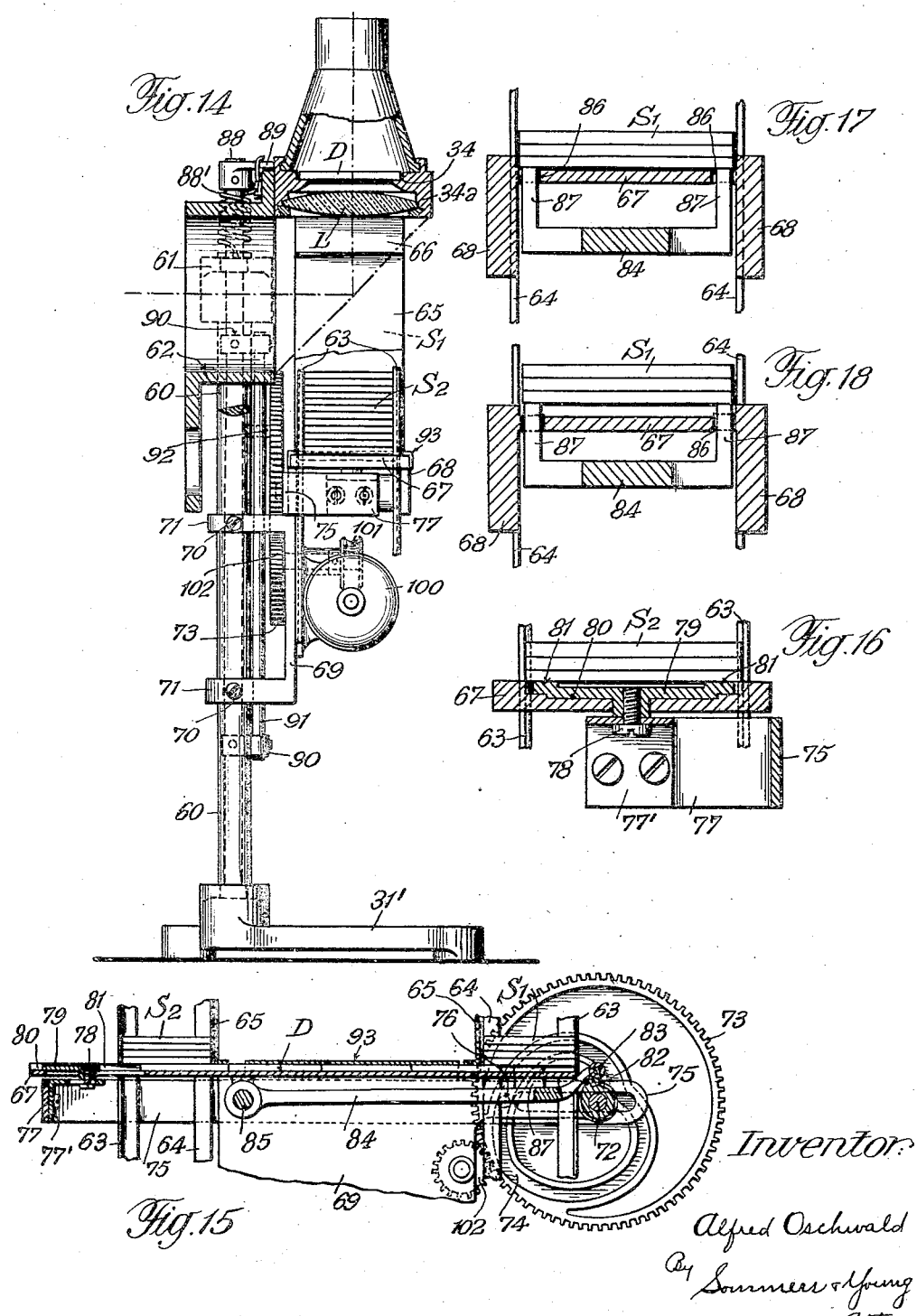

Patented Mar. 14, 1933

1,901,819

UNITED STATES PATENT OFFICE

ALFRED OSCHWALD, OF ZURICH, SWITZERLAND

PROJECTOR COMPRISING AUTOMATIC PICTURE CHANGING MEANS

Application filed September 17, 1932, Serial No. 633,667, and in Germany September 24, 1931.

This invention relates to projectors comprising automatic picture changing means and particularly adapted for using diapositives.

With the known projectors of this type the diapositives were either united in an endless band, which was mechanically moved, or mounted in a spider system arranged in front of the objective. In the operation of these projectors frequent disturbances are apt to arise and, moreover, the number of diapositives insertable in the projector is limited to a relatively small number. Furthermore, the hitherto used projectors for illustrating purposes during lectures were inconvenient in the respect that the diapositives had to be inserted in a movable slide of the apparatus and removed therefrom again by hand which operations were complicated and disturbing, as the speaker was obliged to give the operator of the projector a signal every time a picture was to be exchanged or turned around if it had happened to be unintentionally wrongly inserted.

These disadvantages are obviated with the projector according to the present invention by accommodating the pictures in at least one supply shaft in superimposed relationship and moving the uppermost picture at a time in front of the gate of the projector by means of a feed device, whereupon it is caused to travel backwardly by gravitation in order to be reinserted into the supply shaft from below by means of resetting means driven in timed relationship with the feed device.

Owing to this construction, within the space afforded by the length of the supply shaft, a great number of pictures for projection purposes can be accommodated and since the feed motion and the resetting motion of the pictures is effected automatically no disturbances during the operation are apt to arise, except in the case of a breakdown of the driving motor. In this manner displaying a complete series of pictures for advertising purposes and the like is rendered possible. For lectures the arrangement may be such that the speaker is enabled, for instance by switching means remote from the driving motor, to actuate or stop the motor respectively at will.

In the accompanying drawings several constructional forms of the invention are illustrated by way of example only, in which Fig. 1 shows an elevation of a first form of a projector according to the invention;

Fig. 2 is a vertical section along the line II—II in Fig. 1;

Fig. 3 is a view of a detail;

Figs. 4 and 5 show horizontal sections on the lines IV—IV and V—V in Fig. 1 respectively on a larger scale;

Fig. 6 is a vertical section of a detail;

Fig. 7 shows an elevation of a holding frame for a picture;

Fig. 8 shows a vertical section of Fig. 7;

Fig. 9 illustrates a vertical section through a second constructional form of a projector according to the invention;

Fig. 10 is a vertical section of a detail of Fig. 9;

Fig. 11 is a horizontal section of Fig. 10;

Fig. 12 shows an elevation of a third constructional form of a projector according to the invention, partly in section, on the line XII—XII in Fig. 13;

Fig. 13 is a plan view of Fig. 12;

Fig. 14 is a side elevation of Fig. 12, partly in section;

Fig. 15 is a view of a detail of Fig. 12 showing certain parts in different positions;

Fig. 16 shows a section on the line XVI—XVI in Fig. 13;

Fig. 17 shows a section on the line XVII—XVII in Fig. 13, and

Fig. 18 is a section similar to Fig. 17 but in a different working position of parts.

In the drawings only the parts of the projector essential for a good understanding of the invention are shown.

Referring particularly to the first constructional form of the invention as shown in the Figs. 1 to 8 of the drawings, 1 denotes the frame of the projector which is enclosed in a casing, not shown, and which carries the picture changing means. To the frame 1 an upper horizontal slide track 2 is connected which comprises guide portions for the pictures or diapositives D and the gate 2a of the projector, past the upper side of which the pictures are successively moved. At one of the ends of the slide track a vertical supply shaft 3 containing a number of pictures is positioned which is formed in two telescoped parts 3a and 3b. The lower end of the shaft 3 joins with a carrier member 4 (Figs. 2 and 4) to which it is connected. The other end of the sliding track 2 is provided with a downwardly inclined chute which is also formed in two telescoped parts 5a and 5b in such manner that between its upper portion and the respective end of the sliding track a narrow slit s is provided, whereas the lower end of the chute is deflected towards the carrier member 4 to open on the same. The upper end of the chute 5 projects beyond the sliding track 2 in such manner that a picture, which is pushed towards the chute, at first rides up against the same to assume an inclined position, as shown in Fig. 1, until its lower end is moved opposite the slit s, whereafter the picture slides down the chute 5.

The carrier member 4 is displaceably arranged on an upstanding rod 6 of the frame 1 by an upper arm 4a and a lower arm 4b of said member engaging the rod. In this manner the carrier member is adjustable to any desired height by means of a hand operated clamping device 7. The end of the upper arm 4a is formed in a fork 4c for rotatably carrying a cam disc 8 which is longitudinally adjustably arranged on a driving shaft 9, mounted in the frame of the projector, so as to rotate with this shaft. To the lower end of the shaft 9 a worm wheel 10 is connected which is actuated from the driving motor 12 by means of a worm 11 and suitable gearings.

The carrier member 4 is provided with two laterally projecting arms 4d in which a U-shaped stirrup 13 is mounted which is formed at one end with a projection 13a carrying a roller 14 for cooperation with the cam disc 8. To the bent up ends of the stirrup a resetting plate 15 for the pictures is linked which in its inoperative position forms the continuation of the chute 5. In the carrier member oppositely disposed pairs of pins 16 with tapered end faces are mounted for supporting the stacked pictures in the shaft 3. The corresponding pins 16 of each pair are interconnected by a continuous springy steel wire 17 which is held in a projection 4e and which maintains in its undeflected position the pins in their positions shown in Fig. 4. During the operation of raising a picture by the resetting plate 15, however, the pins 16 are pushed backwardly by the edges of the picture engaging the tapered ends of the pins, until the picture has passed the pins completely. Thereafter this picture sets on top of the pins, when due to the spring action of the wires 17 the pins reassume their advanced positions in which they carry the full weight of the stack of pictures above.

To the supporting arm 19 secured to the upper end of the rod 6 a feed arm 20 is linked and to the upper end of this arm a slide 21 which is guided in a lateral lug 22 of the shaft part 3a. On the drive shaft 9 a cam 23 is carried for rocking the feed arm 20 in the direction towards the shaft against the influence of a spring 24 acting on the arm. The cam is so shaped that the throw of the slide 21 corresponds to the length of a picture or of its holder respectively. During each advance movement of the arm 20, which occurs in synchronism with the resetting movement of the plate 15, the arm shifts a picture for its length away from the stack towards the gate 2a of the projector. Simultaneously the entire row of pictures lying on the sliding track 2 is shifted in the same direction and the picture sliding downwards in the chute 5 reentered into the shaft 3 by the resetting plate. Laterally of the frame 1 a source of light Q for projecting the pictures and a condenser system C inclusive of an inclined reflector S are arranged, the latter deviating the bundle of rays to direct it through the lens L behind the gate 2a, and from thence through the gate and the picture in front of the gate onto a dulled plate which is provided in the casing of the apparatus for displaying the pictures and which is not shown in the drawings.

When it is desired to accommodate a lesser number of pictures in the apparatus, the supply shaft is contracted and the chute together with it by correspondingly displacing the carrier member 4 upwardly.

When the projector is to be used for displaying pictures during a lecture, a control circuit is arranged to extend from the speaker's pulpit to the driving motor 12, thus enabling the speaker to operate the motor at will.

In the Figs. 7 and 8 a holding frame R for a picture for protecting the same against injury is shown. The size of the holding frame corresponds exactly to the clearance space of the shaft 3, the width of the sliding track 2 and the chute 5 respectively.

With the second constructional form of the invention, illustrated in the Figs. 9 to 11, the projectors comprise a frame 31 which is housed in a casing not shown and constituted by a stationary lower part 31a and an extensible upper part 31b. The frame is provided with two vertical picture shafts 32 and 33 respectively, each consisting of two telescoped halves, the upper half of each shaft being connected to the part 31b of the frame and the lower half to the part 31a thereof.

The upper and lower ends of the two picture shafts are interconnected by an upper and a lower sliding track 34 and 35 respectively the lower sliding track 35 being prolonged to extend past the lower end of the shaft 33. The upper sliding track 34 is provided with the gate 34a of the projector including the lens L behind which a projector lamp P, associated with a hollow reflector H, is arranged; the latter two parts are also connected to the upper part 31b of the frame. Above the gate 34a an objective O is positioned. The distance between the two picture shafts is so designed that each sliding track is adapted to receive on its portion between the shafts three pictures laid flat side by side, and the length of the picture shafts is so adjusted that the second picture from the top is flush with the sliding track 34.

At the lower end of the picture shaft 32 the resetting device for the pictures is situated. Laterally of this end a two-armed lever 36 is pivotally carried by the shell of the shaft. The interior end of this lever is linked to a resetting plate 37 which fills the clearance space of the shaft and which in its inoperative position is flush with the lower sliding track 35, as shown in Fig. 9. At two opposite sides of the shell of the shaft pairs of pins 38 are mounted, in thickened portions of the shell, the inner tapered ends of the pins projecting to the interior of the shaft so as to be adapted to carry the stack $S_1$ of pictures. Both pins 38 of each pair are interconnected by a continuous springy steel wire 39 which is supported by a projection 40 and which maintains the pins 38 in their positions shown in Fig. 11. Upon the raising of a picture by the resetting plate 37, the picture pushes the pins backwardly, while moving past the tapered ends of the same, until after it is raised above the pins, whereupon the pins 38, by the spring action of the wires 39, are again advanced in which position they carry the full weight of the stack $S_1$ (Fig. 9).

In the frame 31 of the projector, at the side of the picture frame 32, a drive shaft 42 is mounted in vertical disposition and provided with an upper extensible part 42a. The latter is connected to the upper part 31b of the frame, so as to follow the movements of said part, and carries at its upper end a cam 43. To the upper part 31b of the frame a feed lever 44 is linked which in turn pivotally carries at its upper end a feed slide 45. A spring 44a tends to urge the feed lever towards the cam 43, the latter thus being adapted to rock the lever back and forth during each revolution of the shaft 42, whereby the feed slide 45 is reciprocated over a distance corresponding to a picture length.

On the drive shaft 42, which is actuated from the driving motor by means of a worm gear 46, 47, a cam 48 comprising a lateral curved guideway is fixed on which rides a roller 49 mounted on the free end of the lever 36. In the lower sliding track 35 a slide 50 is displaceably guided which is actuated by means of a connecting rod 51 by an eccentric 52 carried by the shaft 42.

In operation the feed lever 44, by means of the slide 45, pushes during each inward motion the uppermost picture of the stack $S_1$ away from the shaft 32 towards the left, whereby simultaneously the extreme left picture drops in the picture shaft 33. At the same time the lowermost picture of the stack $S_2$ is pushed out towards the right by the slide 50 and simultaneously the outermost right picture on the slide 35 is shoved on the resetting plate 37 through the action of which it is re-entered into the shaft 32. In this manner the pictures circulate positively through a continuous path and altogether automatically without at any place of the path the pictures being caused to drop or tilt abruptly or to distort out of shape.

When it is desired to change the number of pictures inserted in the projector, both shafts are extended or contracted more or less by respectively adjusting the upper half 31b of the frame.

The third constructional form of the projector, as shown in the Figs. 12 to 18, is provided with a frame having a base plate 31' and two vertical columns 60 which are interconnected by an upper traverse 61. The traverse 61 is formed with a central opening 62 for receiving the light rays of a projector lamp not shown. Above the opening 62 in the body of the sliding track 34 a seat 34a for a lens L is provided which receives the light rays reflected by a reflector M to pass them on in the direction of the upper portion of the chain dotted centre line, shown in Fig. 14, in a manner described in connection with the previous constructional form of the projector, to an objective and from there to a screen.

From the lateral ends of the traverse 61 the picture shafts 32 and 33 for conveying the pictures or stacks of pictures $S_1$ and $S_2$ up and down respectively are suspended with their upper ends. The picture shafts are constructed in the manner of cages and constituted by four corner posts the exterior ones of which being suitably composed of angle bars 63 and the interior ones of flat bars 64. The posts 63 and 64 confine between them and guide slabs 65 and 66 a space which corresponds to the size of the holding frames for protecting the pictures, thus adapting the shafts to receive the stacks of pictures $S_1$ and $S_2$.

The posts 63 and 64, which extend parallel to the columns 60, are passed with their lower ends through apertures in the opposite longitudinal ends of a carrier plate 67 which is longitudinally adjustable relatively to the columns 60 and the shafts 32 and 33. The carrier plate 67 for the pictures, on which the stacks or pictures rest during the periods of exposure of a picture, serves in its middle portion at the same time as a lower sliding track for the pictures travelling back from the shaft 33 to the shaft 32. For this purpose the carrier plate is provided with longitudinal marginal ribs 68 spaced apart to be adapted to guide the pictures widthwise between them. The distance between the shafts is again so designed that on the sliding tracks between the shafts three pictures, lying flat behind each other in closed up relationship, can be accommodated as indicated by intercrossing lines in Fig. 13. The upper sliding track 34 serves again for shifting the pictures from the shaft 32 towards the gate and from the same over to the shaft 33.

On the longitudinal edge of the carrier plate adjacent the columns 60 a downwardly directed web plate 69 for fastening driving parts thereto is provided the carrier plate being intended to also act as a supporting base for the entire arrangement for driving the movable members of the projector in a positive manner. For securing the carrier plate 67 to the columns 60 set screws 70 passing through supporting ribs 71 are provided (Fig. 14), but it is obvious that instead of set screws any other suitable fastening means may be applied. The distance of the carrier plate from the upper end of the shafts is so adjusted that with the sliding tracks completely filled with pictures the second picture from the top is flush with these shaft ends.

To this end in the longitudinal marginal ribs 68, underneath the carrier plate 67, a general transverse driving shaft 72 is mounted which carries a drive wheel 73. This wheel is driven by means of a driving motor, for example an electro-motor 100, through the intermediary of a worm gear 10 and a train of gear wheels 102. The drive wheel 73 is provided with a heart-shaped guideway 74 which cooperates with a guide roller 76 mounted at one of the ends of a slide 75 of the resetting device for the pictures.

The slide 75 rides against the upper supporting rib 71 of the web plate 69 between the inner longitudinal marginal rib 68 and the drive wheel 73 and is provided at its end adjacent this wheel with a guide slot for receiving the shaft 72. The end of the slide adjacent the shaft 33 carries a cross member 77 which is screwed to one of the legs of a connecting angle 77' the other leg of which is connected with a slide plate 79 by means of a pin and slot joint 78 (Figs. 12, 13 and 16). The slide plate 79 is guided with its lower part in a bed portion 80 of the carrier plate 67 in longitudinally displaceable manner so as to be adapted to be reciprocated therein in accordance with the movements imparted to the slide 75 by the heart-shaped guideway in the drive wheel 73. The upper part of the slide plate carries two lateral bearing ribs 81 extending in the direction of the sliding movement of the plate for receiving the downwardly moving pictures of the shaft 33.

The driving shaft 72 also carries an eccentric cam 82 which cooperates with a guide roller 83 of a lifting lever 84 of the resetting device for the pictures for moving this lever up and down the lever being pivotally carried on a bearing pin 85 on the side of the web plate 69 remote from the columns 60. The lever 84 extends underneath the carrier plate in the longitudinal direction thereof. Below the shaft 32 two lateral apertures 86 are formed in the carrier plate 67 for the passage of two upstanding lifting fingers 87 (Figs. 17 and 18) for engaging the lateral edges of the pictures lying on the carrier plate.

For effecting the shifting of the pictures, on the upper sliding track 34, on the frame a vertical shaft 88 is rotatably mounted which is influenced by a torsion spring 88' and which carries at its upper end a feed arm 89 of the feed device for the pictures. On the middle portion of this shaft, by means of eccentric portions 90, a guide shaft 91 is fixed for cooperation with a driving member 92, for example in the form of a stud. The stud 92 is connected to the drive wheel 73 and thus adapted to rock the shaft 88 once per revolution of the wheel the resetting movement of the shaft being effected by the spring 88'. The length of the guide shaft is so designed that the driving stud is adapted to cooperate therewith in all positions of adjustment of the carrier plate on the columns.

When, after the filling with pictures, as previously explained, the projector is set in motion the slide 75 cooperating with the lifting lever 84 displaces during each reciprocating movement one picture from the shaft 33 to the sliding track of the carrier plate 67 which for protecting the pictures is covered by a guard shield 93. At the same time the lifting lever moves up and down in timed relationship with the slide, thereby raising the picture lying under the shaft 32 by means of its fingers 87. The movements of the slide and of the lifting lever are so timed that the lifting fingers are maintained in raised position until the slide is advanced a sufficient amount for providing a proper bearing area for the stack above. In the meantime, by action of the slide, the picture situated directly ahead of the shaft 32 has been pushed to the same extent under the stack accommodated in this shaft that during the following downward movement of the lifting fingers the stack in the shaft 32 rests on the lowermost picture. In this manner the previously described supporting device for the stacked pictures including spring-pressed pins is done away with and thus noises obviated which are apt to arise particularly when the pins are abruptly reset by spring action.

Since also the movements of the feed device of the projector, according to the invention, occur in timed relationship with the resetting device and the lifting means of the latter the feed arm 89 is adapted to advance the pictures, arriving at the upper end of the lifter shaft on the upper sliding track, towards the gate in synchronism with the movements of the other pictures included in the apparatus. In this way a perfectly dependable operation of the projector is ensured, so much more as adjustable connections between the movable parts of the apparatus are avoided wherever possible.

With the simple construction of the projector which is devoid of vehemently moving parts, as abruptly released springs, a perfectly noiseless operation of the apparatus is obtained.

I do not limit myself to the particular size, shape, number or arrangement of parts as shown and described all of which may be varied without going beyond the scope of my invention as shown, described and claimed.

I claim:

1. In a projector comprising automatic picture changing means, in combination, a frame, a gate for the projecting light rays carried by said frame, a supply shaft for receiving a number of pictures in superimposed relationship connected to said frame, a feed device associated with one end of said supply shaft for feeding the uppermost pictures of the stack in said supply shaft towards said gate, means for gravitatively returning the exposed pictures towards the other end of said supply shaft, a passageway leading from said supply shaft to said picture returning means and across the gate for receiving the pictures delivered by said feed device in a closed up row, a resetting device for reconveying the returning pictures into said supply shaft, and means for actuating said feed device and said resetting device in timed relationship for positively maintaining a continuous circulation of all the pictures inserted in the projector.

2. In a projector comprising automatic picture changing means, in combination, a frame, a supporting member in said frame, a gate for the projecting light rays carried by said frame, a supply shaft composed of two telescoped parts for receiving a number of pictures in superimposed relationship connected to said frame, a feed device associated with the upper end of said supply shaft for feeding the uppermost pictures of the stack in said supply shaft towards said gate, a chute composed of two telescoped parts for gravitatively returning the exposed pictures towards the lower end of said supply shaft, a slide track including the gate and leading from the upper end of said supply shaft to said chute for receiving the pictures delivered by said feed device in a closed up row, a carrier member interconnecting the lower ends of said supply shaft and said chute, means for adjustably connecting said carrier member to said supporting member of said frame and adapted to adjust the height of said member relatively to the frame according to the number of pictures inserted in the projector, a resetting device operatively connected to said carrier member for reconveying the returning pictures into said supply shaft and means for actuating said feed device and said resetting device in timed relationship for positively maintaining a continuous circulation of all the pictures inserted in the projector.

3. In a projector comprising automatic picture changing means, in combination, a frame, a supporting member in said frame, a gate for the projecting light rays carried by said frame, a supply shaft composed of two telescoped parts for receiving a number of pictures in superimposed relationship connected to said frame, a feed lever pivotally carried by said frame, a resetting spring acting on said feed lever, a feed slide linked to one end of said lever and associated with the upper end of said supply shaft for feeding the uppermost pictures of the stack in said supply shaft towards said gate, a chute composed of two telescoped parts for gravitatively returning the exposed pictures towards the lower end of said supply shaft, a slide track including the gate and leading from the upper end of said supply shaft to said chute for receiving the pictures delivered by said feed slide in a closed up row, a carrier member interconnecting the lower ends of said supply shaft and said chute, means for adjustably connecting said carrier member to said supporting member of said frame and adapted to adjust the height of said member relatively to the frame according to the number of pictures inserted in the projector, a resetting device operatively connected to said carrier member for reconveying the returning pictures into said supply shaft, a drive shaft mounted in said frame alongside of said supporting member, a cam provided on said drive shaft for cooperation with the other end of said feed lever for rocking the lever against the action of said resetting spring, and means for actuating said resetting device from said drive shaft in timed relationship with said feed lever.

4. In a projector comprising automatic picture changing means, in combination, a frame, a supporting member in said frame, a gate for the projecting light rays carried by said frame, a supply shaft composed of two telescoped parts for receiving a number of pictures in superimposed relationship connected to said frame, a feed device associated with the upper end of said supply shaft for feeding the uppermost pictures of the stack in said supply shaft towards said gate, a chute composed of two telescoped parts for gravitatively returning the exposed pictures towards the lower end of said supply shaft, a slide track including the gate and leading from the upper end of said supply shaft to said chute for receiving the pictures delivered by said feed device in a closed up row, spring pressed supporting pins mounted in the lower end of said supply shaft for the picture stack in said shaft, a carrier member interconnecting the lower ends of said supply shaft and said chute, means for adjustably connecting said carrier member to said supporting member of said frame and adapted to adjust the height of said member relatively to the frame according to the number of pictures inserted in the projector, a resetting device operatively connected to said carrier member, a two-armed resetting lever linked to said carrier member, a resetting plate linked to the end of one arm of said lever for lifting the returning pictures past said supporting pins into said supply shaft, a drive shaft mounted in said frame alongside of said supporting member, a lifter cam provided on said drive shaft for cooperation with the other end of said resetting lever, and means for actuating said feed device from said drive shaft in timed relationship with said resetting lever.

5. In a projector comprising automatic picture changing means, in combination, a frame, a gate for the projecting light rays carried by said frame, a supply shaft for receiving a number of pictures in superimposed relationship connected to said frame, a feed device associated with the upper end of said supply shaft for feeding the uppermost pictures of the stack in said supply shaft towards said gate, a return shaft for gravitatively lowering a stack of exposed pictures parallel disposed to said supply shaft, an upper slide track including the gate and interconnecting the upper ends of said supply shaft and said return shaft for receiving the pictures delivered by said feed device in a closed up row, a lower slide track for the pictures interconnecting the lower ends of said supply shaft and said return shaft, a resetting slide cooperating with the lower end of said return shaft for shoving the lowered pictures onto said lower slide track, a vertically reciprocable resetting plate cooperating with the lower end of said supply shaft for raising the returning pictures from said lower slide track into said supply shaft, and means for actuating said feed device, said resetting slide and said resetting plate in timed relationship for positively maintaining a continuous circulation of all the pictures inserted in the projector.

6. In a projector comprising automatic picture changing means, in combination, an extensible frame comprising a lower stationary part and an upper extensible part, a gate for the projecting light rays carried by said frame, an extensible supply shaft for receiving a variable number of pictures in superimposed relationship and composed of a lower part connected to said lower stationary part of said frame and an upper extensible part connected to said upper extensible part of said frame, a feed device associated with the upper end of said supply shaft for feeding the uppermost pictures of the stack in said supply shaft towards said gate, a return shaft for gravitatively lowering a stack of exposed pictures parallel disposed to said supply shaft, an upper slide track including the gate and interconnecting the upper ends of said supply shaft and said return shaft for receiving the pictures delivered by said feed device in a closed up row, a lower slide track for the pictures interconnecting the lower ends of said supply shaft and said return shaft, a resetting slide cooperating with the lower end of said return shaft for shoving the lowered pictures onto said lower slide track, a vertically reciprocable resetting plate cooperating with the lower end of said supply shaft for raising the returning pictures from said lower slide track into said supply shaft, extensible driving means for said feed device adapted for automatic adjustment in accordance with the relative adjustment of the parts of said shafts, and means for actuating said resetting slide and said resetting plate in timed relationship for positively maintaining a continuous circulation of all the pictures inserted in the projector.

7. In a projector comprising automatic picture changing means, in combination, a frame, a gate for the projecting light rays carried by said frame, a cage-like supply shaft for receiving a variable number of pictures in superimposed relationship suspended with its upper end from said frame, a feed device associated with the upper end of said supply shaft for feeding the uppermost pictures of the stack in said supply shaft towards said gate, a cage-like return shaft for gravitatively lowering a stack of exposed pictures parallel disposed to said supply shaft and suspended with its upper end from said frame, an upper slide track including the gate and interconnecting the upper ends of said supply shaft and said return-shaft for receiving the pictures delivered by said feed device, in a closed up row, a carrier member for said picture stacks in said shafts adjustably connected to said frame to be displaceable longitudinally of said shafts in adaptation to the number of pictures to be inserted in the projector, a lower slide track for the pictures carried by said carrier member and interconnecting said supply shaft and said return shaft, a resetting device carried by said carrier member for reconveying the returning pictures into said supply shaft, and means carried by said carrier member for actuating said feed device and said resetting device in timed relationship for positively maintaining a continuous circulation of all the pictures inserted in the projector.

8. In a projector comprising automatic picture changing means, in combination, a frame, a gate for the projecting light rays carried by said frame, a supply shaft comprising four corner posts for receiving a variable number of pictures in superimposed relationship suspended with the upper ends of said posts from said frame, a feed device associated with the upper end of said supply shaft for feeding the uppermost pictures of the stack in said supply shaft towards said gate, a return shaft for gravitatively lowering a stack of exposed pictures parallel disposed to said supply shaft and suspended with the upper ends of said posts from said frame, an upper slide track including the gate and interconnecting the upper ends of said supply shaft and said return shaft for receiving the pictures delivered by said feed device in a closed up row, a carrier member for said picture stacks in said shafts protruded by the lower ends of the corner posts of said shafts and adjustably connected to said frame to be displaceable longitudinally of said shafts in adaptation to the number of pictures to be inserted in the projector, a web plate downwardly projecting from said carrier member on its side adjacent said frame, a lower slide track for the pictures carried by said carrier member and interconnecting said supply shaft and said return shaft, a resetting device carried by said carrier member for reconveying the returning pictures into said supply shaft, and means carried by said carrier member for actuating said feed device and said resetting device in timed relationship for positively maintaining a continuous circulation of all the pictures inserted in the projector, parts of said actuating means being carried by said web plate.

9. In a projector as claimed in claim 8 the combination with the carrier member of a common drive shaft for all the movable parts of the projector transversely mounted in the member, a drive wheel carried by said shaft, a driving motor and an intervening drive gear for said wheel supported by the web plate of the carrier member, and a lifting lever for said resetting device extending longitudinally of the member pivotally connected to said web plate.

10. In a projector as claimed in claim 8 the combination with the carrier member of a common drive shaft for all the movable parts of the projector transversely mounted in the member, a cam carried by said drive shaft, a drive wheel carried by said shaft, a heart-shaped guideway provided in said drive wheel, a resetting slide cooperating with said return shaft and said carrier member and arranged to be longitudinally displaceable relatively to the latter, a lifting lever for said resetting device extending longitudinally of the carrier member pivotally connected at one end to said web plate and cooperating at the other end with said cam for vertical reciprocation, and a driving motor and an intervening drive gear for said wheel supported by the web plate of said carrier member.

11. In a projector as claimed in claim 8 the combination with the carrier member of a common drive shaft for all the movable parts of the projector transversely mounted in the member, a cam carried by said drive shaft, a drive wheel carried by said shaft, a heart-shaped guideway provided in said drive wheel, a resetting slide cooperating with said return shaft and said carrier member and arranged to be longitudinally displaceable relatively to the latter, a lifting lever for said resetting device extending longitudinally of the carrier member pivotally connected at one end to said web plate and cooperating at the other end with said cam for vertical reciprocation, upstanding lifting fingers provided on said lifting lever underneath said supply shaft for engaging the lateral edges of the pictures to be lifted, means for so timing the motion of said lifting fingers and said resetting slide that the fingers are maintained in the raised position until the slide is advanced far enough to provide a proper bearing area for the stack above, and a driving motor and an intervening drive gear for said wheel supported by the web plate of said carrier member.

12. In a projector comprising automatic picture changing means, in combination, a frame, a gate for the projecting light rays carried by said frame, a cage-like supply shaft for receiving a variable number of pictures in superimposed relationship suspended with its upper end from said frame, a feed device associated with the upper end of said supply shaft for feeding the uppermost pictures of the stack in said supply shaft towards said gate, a vertical shaft of said feed device rockably mounted in said frame, an upper feed arm on said rockable shaft, an elongated eccentric guide portion extending longitudinally of said shaft, a cage-like return shaft for gravitatively lowering a stack of exposed pictures parallel disposed to said supply shaft and suspended with its upper end from said frame, an upper slide track including the gate and interconnecting the upper ends of said supply shaft and said return shaft for receiving the pictures delivered by said feed device in a closed up row, a carrier member for said picture stacks in said shafts adjustably connected to said frame to be displaceable longitudinally of said shafts in adaptation to the number of pictures to be inserted in the projector, a lower slide track for the pictures carried by said carrier member and interconnecting said supply shaft and said return shaft, a resetting device for reconveying the returning pictures into said supply shaft, a common drive shaft for said feed device and said resetting device mounted in said carrier member, a drive wheel carried by said drive shaft, a cam member provided on said drive wheel for cooperation with said elongated eccentric guide portion on said vertical shaft for rocking said feed arm in all positions of adjustment of said carrier member on said frame in timed relationship with said resetting device, and means for actuating said common drive shaft.

In testimony whereof I have signed my name to this specification.

ALFRED OSCHWALD.